US006702323B2

United States Patent
Goetz

(10) Patent No.: US 6,702,323 B2
(45) Date of Patent: Mar. 9, 2004

(54) AIR BAG MODULE WITH PRESSURE REGULATOR

(75) Inventor: George W. Goetz, Fountain Hills, AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/962,780

(22) Filed: Sep. 25, 2001

(65) Prior Publication Data

US 2003/0057686 A1 Mar. 27, 2003

(51) Int. Cl.$^7$ ............................................... B60R 21/26
(52) U.S. Cl. ..................... 280/736; 280/740; 280/742; 280/728.2
(58) Field of Search ........................... 280/728.2, 736, 280/740, 741, 742

(56) References Cited

U.S. PATENT DOCUMENTS

| | | | | | |
|---|---|---|---|---|---|
| 3,960,390 A | * | 6/1976 | Goetz | ......................... | 280/731 |
| 4,068,862 A | * | 1/1978 | Ishi et al. | ................... | 280/740 |
| 4,178,017 A | * | 12/1979 | Ishi et al. | ................... | 280/740 |
| 5,110,647 A | * | 5/1992 | Sawada et al. | ............... | 428/43 |
| 5,437,472 A | * | 8/1995 | Kuretake et al. | ........... | 280/737 |
| 5,516,147 A | * | 5/1996 | Clark et al. | ................. | 280/737 |
| 5,615,907 A | * | 4/1997 | Stanger | ................... | 280/728.2 |
| 5,860,672 A | * | 1/1999 | Petersen | .................. | 280/728.2 |
| 5,951,040 A | * | 9/1999 | McFarland et al. | ......... | 280/736 |
| 5,984,352 A | * | 11/1999 | Green, Jr. et al. | .......... | 280/736 |
| 6,032,979 A | * | 3/2000 | Mossi et al. | ................ | 280/741 |
| 6,106,002 A | * | 8/2000 | Haesaert et al. | ......... | 280/728.2 |
| 6,142,515 A | | 11/2000 | Mika | | |
| 6,176,512 B1 | * | 1/2001 | Rodriguez | ............... | 280/728.2 |
| 6,273,463 B1 | * | 8/2001 | Peterson et al. | ............ | 280/739 |

* cited by examiner

Primary Examiner—Paul N. Dickson
Assistant Examiner—George D Spisich
(74) Attorney, Agent, or Firm—Tarolli, Sundheim, Covell & Tummino L.L.P.

(57) ABSTRACT

A vehicle occupant protection apparatus (10) comprises an inflatable device (12) and an inflator (14) having a housing (20). The inflator (14) is actuatable to provide inflation fluid for inflating the inflatable device (14). The housing (20) has a fluid flow area (52, 55) for directing flow of inflation fluid out of the housing to the inflatable device (12). The apparatus (10) also comprises a retainer (16) for retaining the protection device (12) in position relative to the housing (20). The retainer (16) has a portion (274, 282) at least partially blocking the fluid flow area (52, 55) when the inflator (14) is unactuated. The retainer portion (274, 282) moves due to the pressure of inflation fluid acting on the retainer portion (274, 282) upon actuation of the inflator (14) to increase the fluid flow area (52, 55).

18 Claims, 3 Drawing Sheets

AIR BAG MODULE WITH PRESSURE REGULATOR

BACKGROUND OF THE INVENTION

1. Technical Field

The present invention relates to an apparatus for inflating an inflatable vehicle Occupant Protection device. In Particular, the present invention relates to an air bag module including an inflator and a pressure regulator for controlling pressure in the inflator.

2. Description of the Prior Art

An inflatable vehicle Occupant protection device, such as an air bag, is deployed upon the occurrence of a vehicle crash. The air bag is part of a vehicle Occupant protection apparatus, which further includes a crash sensor and an inflator. The inflator includes a housing and an inflation fluid source, such as a solid propellant, in the housing. When the crash sensor senses a crash-indicating condition for which deployment of the air bag is desired, the inflator is actuated and produces inflation fluid under pressure in the inflator housing. The pressurized inflation fluid is directed out of the inflator housing and inflates the air bag into the vehicle occupant compartment. When the air bag is deployed in this manner, it helps to protect an occupant of the vehicle from a forceful impact with parts of the vehicle as a result of the crash.

It is known to use a pressure regulator, or flow regulator, to control the pressure in the inflator and the flow of inflation fluid out of the inflator. This can be done to accommodate very low or high ambient temperatures, and to facilitate combustion of the propellant in the inflator.

SUMMARY OF THE INVENTION

The present invention is an apparatus comprising an inflatable vehicle occupant protection device and an inflator having a housing. The inflator is actuatable to provide inflation fluid for inflating the inflatable device. The housing has a fluid flow area for directing flow of inflation fluid out of the housing to the inflatable device. The apparatus also comprises a retainer for retaining the protection device in position relative to the housing. The retainer has a portion at least partially blocking the fluid flow area when the inflator is unactuated. The retainer portion moves due to the pressure of inflation fluid acting on the retainer portion upon actuation of the inflator to increase the fluid flow area.

BRIEF DESCRIPTION OF THE DRAWINGS

Further features of the present invention will become apparent to those skilled in the art to which the present invention relates from reading the following description with reference to the accompanying drawings, in which.

DESCRIPTION OF THE INVENTION

Figure 1:
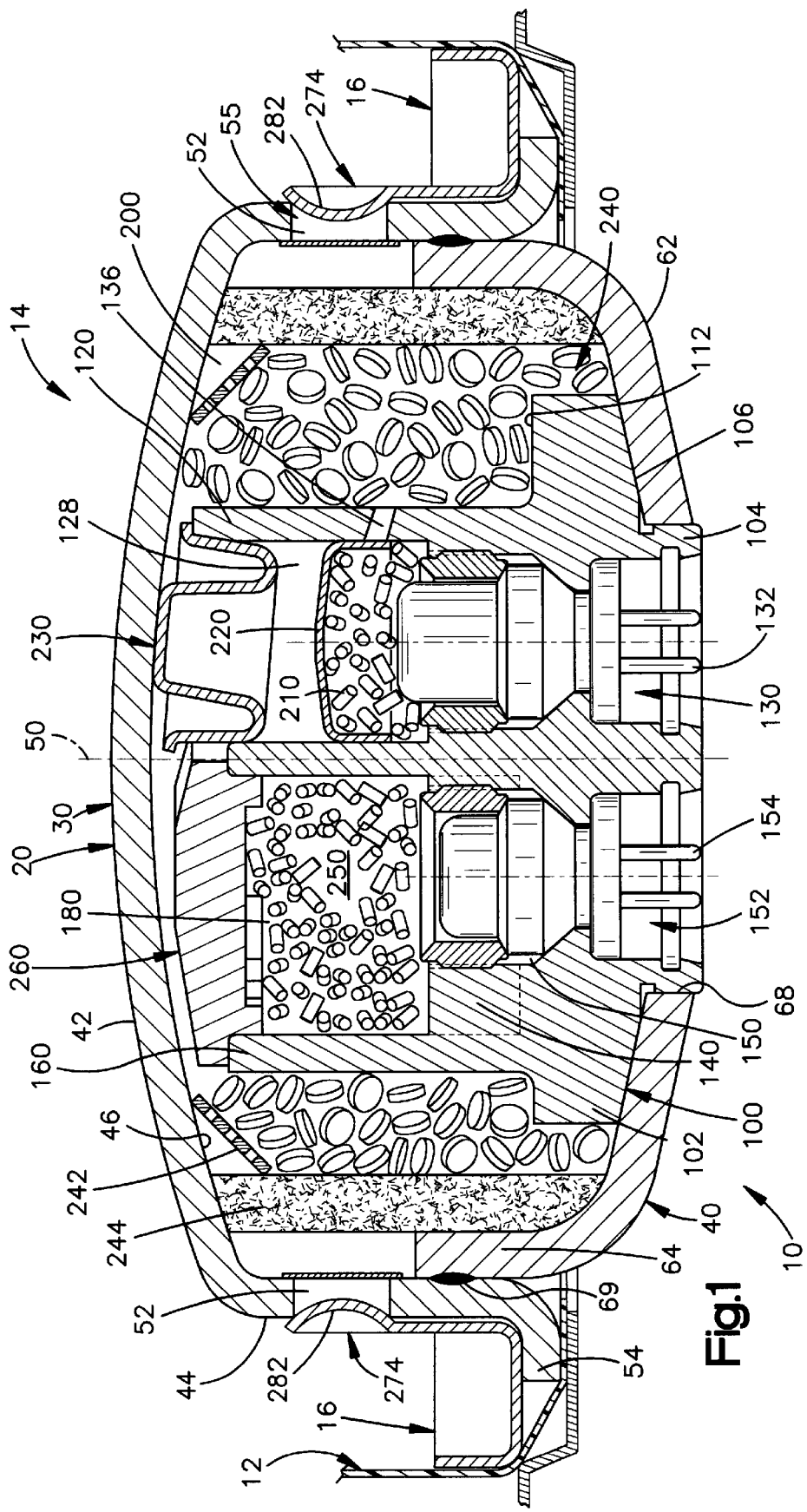
FIG. 1 is a sectional view of a vehicle occupant protection apparatus constructed in accordance with the present invention.

The present invention relates to an apparatus for inflating an inflatable vehicle occupant protection device. In particular, the present invention relates to an air bag module including an inflator and a pressure regulator for controlling pressure in the inflator. As representative of the present invention, FIG. 1 illustrates a vehicle occupant protection apparatus or air bag module 10.

The module 10 includes an inflatable vehicle occupant protection device 12. In the preferred embodiment of the invention, the protection device 12 is an air bag for helping to protect a driver of a vehicle. Other inflatable vehicle occupant protection devices that can be used in accordance with the present invention include, for example, inflatable seat belts, inflatable knee bolsters, inflatable head liners, inflatable side curtains, and knee bolsters operated by inflatable air bags.

The module also includes an inflator 14, which is electrically actuatable to provide inflation fluid for inflating the air bag 12. When the air bag 12 is inflated, it extends into a vehicle occupant compartment (not shown) to help protect a vehicle occupant from a forceful impact with parts of the vehicle, such as the vehicle steering wheel, as a result of a crash. The module 10 also includes, in addition to the inflator 14 and the air bag 12, a retainer, or retaining ring 16.

The inflator 14 is constructed generally as shown in U.S. Pat. No. 6,142,515. Specifically, the inflator 14 includes a generally cylindrical housing or shell 20. The inflator 14 has a circular configuration as viewed from above. The housing 20 includes a first or upper (as viewed in FIG. 2) housing part 30, referred to herein as a diffuser, and a second or lower (as viewed in FIG. 2) housing part 40, referred to herein as a closure.

The diffuser 30 has an inverted, cup-shaped configuration centered on an axis 50 of the inflator 14. The diffuser 30 includes a radially extending end wall 42 and an axially extending side wall 44. The end wall 42 of the diffuser 30 is domed, that is, has a curved configuration projecting away from the closure 40. The end wall 42 has an inner side surface 46.

The side wall 44 of the diffuser 30 has a cylindrical configuration centered on the axis 50. A plurality of inflation fluid outlets 52 are disposed in a circular array on the side wall 44. An annular inflator mounting flange 54 extends radially outward from the side wall 44 at a location below (as viewed in FIG. 2) the inflation fluid outlets 52.

Each one of the inflation fluid outlets 52 extends radially through the side wall 44. The outlets 52 enable flow of inflation fluid out of the inflator 10 to inflate the air bag 12. The outlets 52, as a group, form a fluid passage 55 that has a fixed, predetermined fluid flow area. The outlets 52 are covered, on the inside of the diffuser 30, with a rupturable tape 56 (FIG. 2), such as aluminum tape, to seal the inflator housing 20.

The closure 40 (FIG. 1) has a cup-shaped configuration including a radially extending end wall 62 and an axially extending side wall 64. The end wall 62 of the closure 40 is domed, that is, has a curved configuration projecting away from the upper housing part 30. A circular opening 68 in the end wall 62 is centered on the axis 50.

Figure 2:
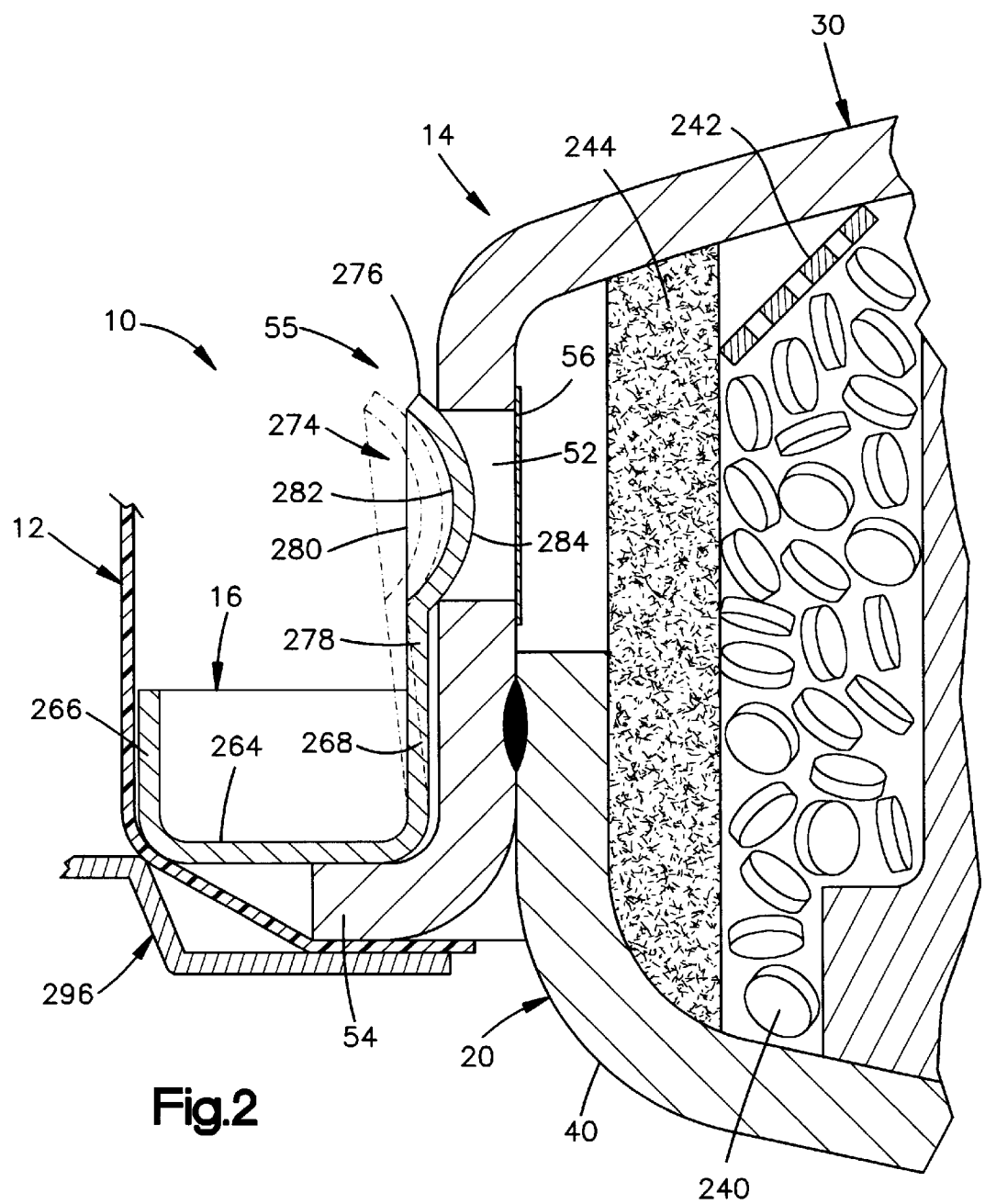
FIG. 2 is an enlarged view of a portion of FIG. 1.

The side wall 64 of the closure 40 has a cylindrical configuration centered on the axis 50. The outer diameter of the side wall 64 of the closure 40 is approximately equal to the inner diameter of the side wall 44 of the diffuser 30. The closure 40 is nested inside the upper housing part 30, as seen in FIG. 2. The side wall 64 of the closure 40 is welded to the side wall 44 of the upper housing part 30 with a single, continuous weld 69.

The inflator 14 includes an igniter housing 100. The igniter housing 100 is located centrally in the inflator 14. The igniter housing 100 includes a mounting portion 102, a primary initiator wall 120, a secondary initiator wall 140, and a secondary propellant chamber wall 160.

The mounting portion 102 of the igniter housing 100 is disposed at the lower end of the igniter housing 100. A cylindrical end portion 104 of the mounting portion 102 extends into the circular central opening 68 in the end wall 62 of the closure 40. Above the end portion 104, the mounting portion 102 has a radially extending lower side surface 106, which is in engagement with the end wall 62 of the closure 40.

The primary initiator wall 120 of the igniter housing 100 projects axially from an upper side surface 112 of the mounting portion 102. The wall 120 has a cylindrical configuration and is not centered on the axis 50. The axis 50 extends through the wall 120.

The primary initiator wall 120 defines a primary ignition chamber 128 radially inward of the wall. A primary initiator 130 is mounted in the primary ignition chamber 128. The primary initiator 130 is a known device that is electrically actuatable by an electric current applied through terminals 132 to generate combustion products. A plurality of ports or passages 136 are formed in the primary initiator wall 120, above the primary initiator 130. The passages 136 extend between the primary ignition chamber 128 and the exterior of the igniter housing 100.

The secondary initiator wall 140 of the igniter housing 100 projects axially from the upper side surface 112 of the mounting portion 102 of the igniter housing 100. The wall 140 has a generally cylindrical configuration extending parallel to the axis 50. The wall 140 has a portion in common with the primary initiator wall 120. The secondary initiator wall 140 is not centered on the axis 50. The inflator axis 50 extends through the common wall portion.

The secondary initiator wall 140 defines a secondary ignition chamber 150 radially inward of the wall 140. A secondary initiator 152 is mounted in the secondary ignition chamber 150. The secondary initiator 152 is a known device that is electrically actuatable by an electric current applied through terminals 154 to generate combustion products.

The secondary propellant chamber wall 160 of the igniter housing 100 extends axially upward from the upper side surface 112 of the mounting portion 102 of the igniter housing. The wall 160 is, throughout most of its circumference, spaced outward from and encloses the secondary initiator wall 140. A secondary propellant chamber 180 is defined inside the secondary propellant chamber wall 160. A ring-shaped primary propellant chamber or combustion chamber 200 is defined inside the side wall 44 of the diffuser 30 and outside the igniter housing 100.

A primary ignition material 210 is located in the primary ignition chamber 128, adjacent to and in contact with the primary initiator 130. The primary ignition material 210 is a known material that is ignitable by the primary initiator 130 and that, when ignited, generates combustion products. A known autoignition material is mixed in with the primary ignition material 210.

A cup-shaped metal igniter cap 220 is disposed in the primary ignition chamber 128 in the igniter housing 100. The igniter cap 220 contains the primary ignition material 210 in the primary ignition chamber 128. The igniter cap 220 is press fit inside the primary initiator side wall 120 of the igniter housing 100.

A metal spring cap 230 closes the upper end of the primary ignition chamber 128 in the igniter housing 100. The spring cap 230 is spaced apart axially from the igniter cap 220, with open space between them. The spring cap 230 is press fit inside the primary initiator side wall 120.

The inflator 14 includes a first actuatable inflation fluid source 240 in the form of a solid propellant. The propellant 240 is located in the primary combustion chamber 200, surrounding the igniter housing 100. The propellant 240 is a known material that is ignitable by the combustion products of the primary ignition material 210 and that, when ignited, produces inflation fluid in the form of gas under pressure for inflating the air bag 12. The propellant 240 is illustrated as being provided in the form of a plurality of tablets filling or substantially filling the primary propellant chamber 200. The propellant 240 could, alternatively, be provided in the form of small pellets or discs. A perforated metal propellant retainer 242 and a filter 244 help prevent movement and rattling of the propellant 240.

The inflator 14 includes a second actuatable inflation fluid source 250 in the form of a solid propellant. The secondary propellant 250 is located in the secondary propellant chamber 180. The secondary propellant 250 is a known material that is ignitable by the secondary initiator 152 and that, when ignited, produces inflation fluid in the form of gas under pressure for inflating the air bag 12. The secondary propellant 250 may be made from the same material as the primary propellant 240. The secondary propellant 250 is illustrated as being provided in the form of a plurality of small pellets filling or substantially filling the secondary propellant chamber 180. The secondary propellant 250 could, alternatively, be provided in the form of discs or tablets.

A secondary cap 260 closes the upper end of the secondary propellant chamber 180 in the igniter housing 100. The secondary cap 260 contains the secondary propellant 250 in the secondary propellant chamber 180.

The igniter housing 100 is trapped or captured axially between the diffuser 30 and the closure 40. Specifically, the distance between the diffuser 30 and the mounting portion 102 of the igniter housing 100 is selected so that, when the housing parts 30 and 40 are welded together with the igniter housing inside, the spring cap 230 resiliently engages the end wall 42 of the diffuser 30. The mounting portion 102 of the igniter housing 100 is pressed axially into engagement with the closure 40.

Figure 3:
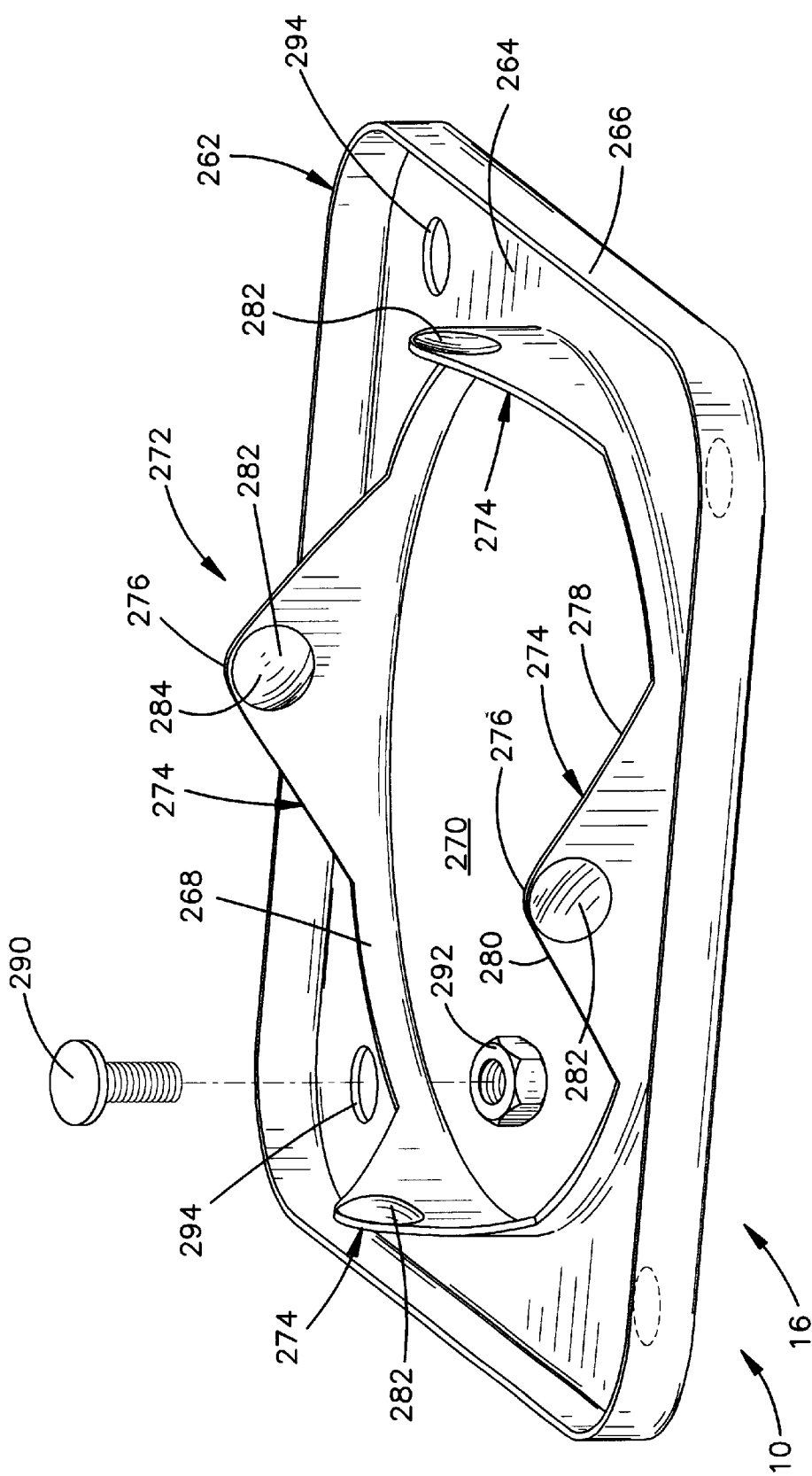
FIG. 3 is a perspective view of a retainer that forms part of the apparatus of FIG. 1.

The retainer 16 illustrated in FIGS. 1-3 is a one-piece metal member formed by stamping or a similar operation. A retainer 16 in accordance with the present invention could be made from a material other than metal, could be made from more than one piece, and could be made in a different manner or have a different configuration.

The retainer 16 (FIGS. 2 and 3) includes a clamping portion 262 for clamping the air bag 12 to the inflator 14. The clamping portion 262 of the retainer 16 has a generally L-shaped cross-sectional configuration including a planar base plate 264 that extends perpendicular to the axis 50. The base plate 264 has a square outer periphery and a circular inner periphery. The clamping portion 262 also includes an outer rim 266 that extends upward from the outer periphery of the base plate 264, in a direction parallel to the axis 50. At the inner periphery of the base plate 264, the retainer 16 has a cylindrical inner rim 268 that also extends upward in a direction parallel to the axis 50. The inner rim 268 extends around and defines a circular central opening 270 of the retainer 16, through which the inflator 14 extends.

The retainer 16 includes a pressure regulating portion 272 for regulating the pressure inside the inflator housing 20. The pressure regulating portion 272 of the retainer 16 is formed as one piece with the clamping portion 262. The pressure regulating portion 272, in the illustrated embodiment, includes four fingers 274 that extend axially from the inner rim 268 of the retainer 16. The four fingers 274 are spaced apart equally in a circular array centered on the axis 50.

Each one of the fingers 274 has a generally triangular configuration tapering outward from the inner rim 268 to an end point 276. The triangular configuration of each finger 274 includes a base portion 278 that merges with the inner rim 268 and an end portion 280 spaced apart from the inner rim. On each finger 274, a dome 282 is formed on the end portion 280. The dome 282 has a convex outer surface 284 presented toward the axis 50. When the inflator 14 and the retainer 16 are assembled in the apparatus 10, as shown in FIGS. 2 and 3, each one of the domes 282 extends partially into a respective one of the inflation fluid outlets 52 of the diffuser 30 of the inflator.

The fingers 274 are movable relative to the base plate 264 of the clamping portion 262 of the retainer 16. Specifically, each one of the fingers 274 is bendable, relative to the base plate 264, so that its end portion 280, including the dome 282, moves away from the inflator housing 20, in a direction away from the axis 50. When such movement occurs, the inflation fluid outlets 52 are at least partially uncovered.

When the fingers 274 are spaced apart from the inflation fluid outlets 52 by a large distance, the fingers do not restrict fluid flow through the outlets. When the fingers 274 are close to the inflation fluid outlets 52, the fingers at least partially restrict or block fluid flow through the outlets. Prior to actuation of the inflator 14, the domes 282 on the fingers 274 of the retainer 16 at least partially block fluid flow through the inflation fluid openings 52. In a preferred embodiment, the fingers 274 are resilient, that is, the fingers are elastically deformable rather than merely plastically deformable, and can move both away from and then back toward or into engagement with the side wall 44 of the diffuser 30.

The inflator 14, air bag 12, and retainer 16 are secured to each other with four studs 290 and nuts 292 (FIG. 3). The retainer 16 has four fastener openings 294 disposed in a circular array having a diameter greater than the diameter of the inner rim 268. The threaded studs 290 extend through the fastener openings 294 in the retainer 16. Each fastener 290 also extends through a fastener opening (not shown) in the air bag 12 and a fastener opening (not shown) in a module mounting plate 296 (FIGS. 1 and 2). The nuts 292 are screwed on the studs 290 to clamp the air bag 12 and the mounting flange 54 of the inflator 14 between the retainer 16 and the mounting plate 296.

In the event of a vehicle crash at or above a first predetermined threshold level of crash severity, but below a second predetermined threshold level of crash severity, an electric signal is applied to only the terminals 132 of the primary initiator 130 of the inflator 14. The primary initiator 130 is actuated and ignites the primary ignition material 210. The combustion products of the primary ignition material 210 flow through the passages 136 into the primary combustion chamber 200.

The combustion products flowing into the primary propellant chamber 200 ignite the primary propellant 240. The primary propellant 240 combusts and produces inflation fluid under pressure in the primary propellant chamber 200. The pressure in the primary propellant chamber 200 rises rapidly to a pressure in the range of about 1,000 psi to about 2,000 psi or more.

The secondary cap 260 during this time blocks flow of combustion products from the primary propellant chamber 200 (which surrounds the secondary cap) into the secondary propellant chamber 180. This prevents ignition of the secondary propellant 250 when the primary initiator 130 is actuated but the secondary initiator 152 is not actuated.

The pressure of the inflation fluid ruptures the tape 56, and inflation fluid flows out of the primary propellant chamber 200 through the inflation fluid outlets 52. The inflation fluid strikes the domes 282 on the fingers 274 of the retainer 216, and exerts force against the end portions 280 of the fingers.

The flow area of the fluid passage 55 that comprises the outlets 52 varies in accordance with the pressure of inflation fluid in the housing 20 and, thereby, with the force exerted on the fingers 274 of the retainer 16. The higher the pressure in the housing 20, the greater the force exerted by the inflation fluid against the end portions 280 of the fingers 274, and the more the fingers deflect or deform outward. The more the fingers 274 deflect outward, away from the housing 20, the greater the flow area of the fluid passage 55. Thus, the retainer fingers 274 act as a control for the rate of fluid flow out of the inflator 14.

The retainer fingers 274 thus also act as a regulator for the pressure of the inflation fluid in the inflator housing 20. As the fingers 274 move outward to increase flow area, the pressure inside the housing 20 can decrease. Because the flow area of the fluid passage 55 varies in accordance with the pressure of inflation fluid in the housing 20, the internal operating pressure of the inflator 14 is self-regulating.

In the event of a vehicle crash at or above the second predetermined threshold level of crash severity, both the primary initiator 130 and the secondary initiator 152 of the inflator 14 are actuated. The actuation of the primary initiator 130 results in ignition of the primary propellant 240 as described above. Inflation fluid produced by the primary propellant 240 flows out of the inflator 14 as described above.

The secondary initiator 152 is actuated by an electric signal applied to the terminals 154 of the secondary initiator. The secondary initiator 152 ignites the secondary propellant 250. The secondary propellant 250 produces combustion products, which increase the pressure in the secondary combustion chamber 180. This increased pressure acts on the secondary igniter cap 260 and causes the secondary igniter cap to move upward as viewed in FIG. 1, out of engagement with the igniter housing 100.

The combustion products of the secondary propellant 250 flow out of the secondary combustion chamber 180 and join with the combustion products of the primary propellant 240 in the primary combustion chamber 200. The resulting increase of pressure in the primary combustion chamber 200 causes the fingers 274 of the retainer 16 to bend or deform more than they do when only the primary propellant 240 is ignited. This increased bending or deformation of the fingers 274 increases the flow area of the passage 55.

The retainer 16 may be constructed so that the movement of the fingers 274 is elastic. In this case, the pressure in the inflator housing 20 can be maintained even if the fluid output from the burning propellant decreases over time. The retainer 16 may, alternatively, be constructed so that the movement of the fingers 274 is plastic, if it is expected that the fluid output from the burning propellant in the housing 20 will increase continuously.

The present invention may be particularly useful in a dual stage inflator, such as the inflator 10. In the event of a significant delay between actuation of the first and second stages, the fingers 274, if resilient, can help to maintain the pressure in the inflator housing 20 prior to combustion of the second stage. Additionally, the fingers 274 can help to maintain a desired constant pressure in the inflator housing 20 during the different circumstances of actuation of either one or both stages of the inflator 14.

From the above description of the invention, those skilled in the art will perceive improvements, changes and modifications in the invention. For example, the elements blocking fluid flow from the inflator housing could be part of a bendable member other than the retainer, and could be attached directly to the inflator. Such improvements, changes and modifications within the skill of the art are intended to be covered by the appended claims.

Having described the invention, I claim:

1. An apparatus comprising:

an inflatable vehicle accupant protection device;

an inflator having a housing, said inflator being actuatable to provide inflation fluid for inflating the inflatable device;

said housing of said inflator having a fluid flow area for directing flow of inflation fluid out of said inflator to the inflatable device; and a retainer for retaining said protection device in position relative to said housing when said inflator is unactuated, said retainer having at least one dome-shaped portion at least partially blocking said fluid flow area when said inflator is unactuated and a clamping portion for clamping said inflator to said protection device;

said at least one dome-shaped portion of said retainer moving due to the pressure of inflation fluid acting on said at least one dome-shaped portion of said retainer upon actuation of said inflator to increase said fluid flow area.

2. An apparatus as set forth in claim 1 wherein said fluid flow area varies in accordance with the pressure of the inflation fluid acting on said portion of said retainer.

3. An apparatus as set forth in claim 1 wherein said movement of said at least one dome-shaped portion of said retainer results in plastic deformation of said retainer.

4. An apparatus as set forth in claim 1 wherein said movement of said at least one dome-shaped portion of said retainer results in elastic deformation of said retainer.

5. An apparatus as set forth in claim 1 wherein said inflator comprises a first actuatable inflation fluid source and a second inflation fluid source that is actuatable independently of said first inflation fluid source.

6. An apparatus as set forth in claim 1 wherein said fluid flow area is defined by a plurality of inflation fluid outlets of said inflator.

7. An apparatus as set forth in claim 1 wherein said at least one dome-shaped portion of said retainer forms at least one pressure regulating portion for regulating the pressure in said housing, said least one pressure regulating portion being movable relative to said clamping portion due to the pressure of inflation fluid acting on said at least one pressure regulating portion upon actuation of said inflator to increase said fluid flow area.

8. An apparatus as set forth in claim 1 wherein each of said at least one dome-shaped potions of said retainer is a movable member in abutting engagement with said inflator housing.

9. An apparatus as set forth in claim 1 wherein said inflator has a generally cylindrical configuration centered on an axis, said fluid flow area is defined by a plurality of fluid outlets disposed in an array extending around said axis, each of said at least one dome-shaped portions of said retainer at least partially covers a respective one of said fluid outlets when said inflator is unactuated.

10. An apparatus as set forth in claim 1 wherein said retainer is a retaining ring that extends around said inflator.

11. An apparatus comprising:

and inflatable vehicle accupant protection device;

an inflator having a housing and a radially extending flange, said inflator containing an ignitable gas generating propellant that is ignitable to provide inflation fluid for inflating the inflatable device;

said housing of said inflator having a fluid flow area for directing flow of inflation fluid out of said inflator to the inflatable device; and a retainer for retaining said protection device in position relative to said housing when said inflator is unactuated, said retainer having a clamping portion and a pressure regulating portion, said pressure regulating portion being movable relative to said clamping portion to effectively vary the size of said fluid flow area throughout ignition of said propellant and thereby regulate the pressure in said inflator acting on said propellant throughout ignition of said propellant, said clamping portion clamping said flange of said inflator to said protection device.

12. An apparatus as set forth in claim 11 wherein said clamping portion of said retainer extends around said inflator and secures said protection device in position relative to said inflator, said pressure regulating portion of said retainer comprising a plurality of fingers extending from said clamping portion for at least partially blocking said fluid flow area when said inflator is unactuated.

13. An apparatus as set forth in claim 12 wherein said clamping portion of said retainer defines a central opening of said retainer through which said inflator extends, said fingers extending in a direction transverse to said opening.

14. An apparatus for providing inflation fluid for inflating and inflatable vehicle occupant protection device, said apparatus comprising:

an inflator having a housing, said inflator being actuatable to provide inflation fluid for inflating the inflatable vehicle accupant protection device;

said housing of said inflator having a fluid flow area for directing flow of inflation fluid out of said inflator to the inflatable device;

at least one clamping member for clamping said inflator to said protection device when said inflator is unactuated; and at least one bendable member disposed adjacent said fluid flow area and having a portion at least partially blocking said fluid flow area when said inflator is unactuated;

said at least one bendable member elastically bending away from said fluid flow area die to the pressure inflation fluid acting on said portion upon actuation of said inflator to enable and increase in flow of inflation fluid out of said housing.

15. An apparatus as set forth in claim 14 wherein said at least one clamping member and said at least one bendable member comprise portions of a retainer for retaining said protection device in position relative to said housing.

16. An apparatus as set forth in claim 15 wherein said housing has a plurality of fluid flow outlets defining said fluid flow area, said portion of each of said at least one bendable member comprising a movable finger associated in a one relationship with said fluid flow outlets and in abutting engagement with said inflator housing.

17. An apparatus as set forth in claim 14 wherein said housing has a plurality of fluid flow outlets defining said fluid flow area, said portion of each of said at least one bendable member comprising a movable finger associated in a one relationship with said fluid flow outlets and in abutting engagement with said inflator housing.

18. An apparatus as set forth in claim 11 wherein said clamping portion has a generally rectangular outer periphery and a generally circular central opening, said pressure regulating portion being arranged about said central opening.

* * * * *